United States Patent
Kim et al.

(10) Patent No.: US 8,538,952 B2
(45) Date of Patent: Sep. 17, 2013

(54) APPARATUS AND METHOD TO SEARCH CONTENT IN MULTIMEDIA DEVICE

(75) Inventors: Yong-sung Kim, Suwon-si (KR);
Tae-ung Jung, Suwon-si (KR);
Dong-hyun Roh, Suwon-si (KR);
So-hee Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 11/723,832

(22) Filed: Mar. 22, 2007

(65) Prior Publication Data

US 2007/0294227 A1 Dec. 20, 2007

(30) Foreign Application Priority Data

Jun. 15, 2006 (KR) .................. 10-2006-0054003

(51) Int. Cl.
*G06F 17/30* (2006.01)
(52) U.S. Cl.
USPC ............................ 707/713; 707/770; 707/803
(58) Field of Classification Search
USPC ................. 345/173; 709/203; 707/770, 805, 707/713, 803
See application file for complete search history.

(56) References Cited

U.S. PATENT DOCUMENTS

| 7,162,466 B2 | 1/2007 | Kaasten et al. |
| 7,627,552 B2 | 12/2009 | Moore et al. |
| 2005/0027673 A1 | 2/2005 | Moritani et al. |
| 2007/0040813 A1* | 2/2007 | Kushler et al. ................ 345/173 |
| 2008/0107264 A1* | 5/2008 | Van Wie et al. ................ 380/201 |
| 2009/0177742 A1* | 7/2009 | Rhoads et al. ................ 709/203 |
| 2010/0023866 A1* | 1/2010 | Peck et al. ..................... 715/735 |

FOREIGN PATENT DOCUMENTS

| CA | 2468462 A1 | 9/2004 |
| CN | 1585946 | 2/2005 |
| JP | 2004-234175 | 8/2004 |
| JP | 2005-044104 | 2/2005 |
| WO | WO 03/042868 | 5/2003 |
| WO | WO 2004/097682 A1 | 11/2004 |

OTHER PUBLICATIONS

Chinese Office Action issued on Sep. 6, 2010, in corresponding Chinese Patent Application No. 200710109189.8 (14 pages).
Chinese Office Action issued on Mar. 1, 2012, in counterpart Chinese Patent Application No. CN200710109189.8 (15 pages), with English language translation (20 pages).
Korean Office Action issued Jul. 17, 2012 in counterpart Korean Application No. 10-2006-0054003 (4 pages, in Korean).

* cited by examiner

*Primary Examiner* — Shahid Alam
(74) *Attorney, Agent, or Firm* — NSIP Law (57) ABSTRACT

An apparatus and method to search content in a multimedia device, and more particularly, an apparatus and method to efficiently search content in a multimedia device using various metadata of the content, the apparatus including: a content storage unit to store content; a metadata storage unit to store metadata of the stored content; a user input unit to receive an input of a current arrangement standard, from one or more arrangement standards corresponding to the metadata, from a user; a content arrangement unit to arrange the stored content according to the current arrangement standard; and a user interface provision unit to provide a user interface that displays the arranged content.

33 Claims, 8 Drawing Sheets

APPARATUS AND METHOD TO SEARCH CONTENT IN MULTIMEDIA DEVICE

CROSS-REFERENCE TO RELATED APPLICATION

This application claims the benefit of Korean Patent Application No. 2006-54003 filed on Jun. 15, 2006 in the Korean Intellectual Property Office, the disclosure of which is incorporated herein by reference.

BACKGROUND OF THE INVENTION

1. Field of the Invention

Aspects of the present invention relate to an apparatus and method to search content in a multimedia device, and more particularly, to an apparatus and method to efficiently search content in a multimedia device using various metadata of the content.

2. Description of the Related Art

As digital storage apparatuses become less expensive with increased capacities, the amount of content that needs to be processed by multimedia devices, which utilize the digital storage apparatuses, is rapidly increasing.

Digital storage apparatuses used by multimedia devices are now capable of storing not only hundreds, but also thousands or tens of thousands of pieces of content. Accordingly, the manner in which users search a plurality of pieces of content stored in digital storage apparatuses for desired content is becoming an important matter for multimedia devices using the digital storage apparatuses.

Unlike computers, many multimedia devices have limitations on interfaces used to search content and include input devices with limited input functions, such as remote controls. As a result, these multimedia devices require a considerable amount of time for users to find desired content.

Figure 1:
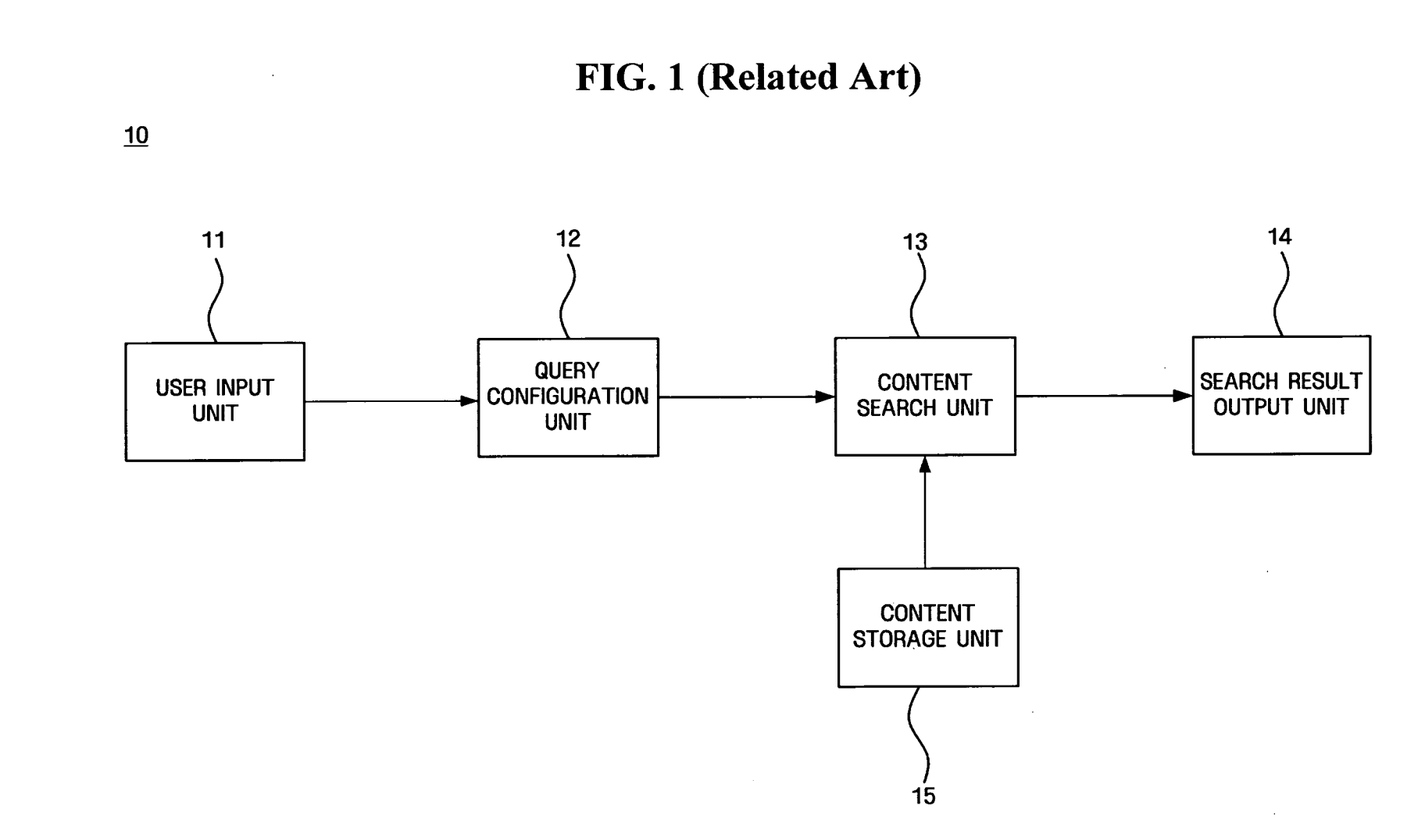
FIG. 1 is a block diagram of a conventional apparatus to search content in a multimedia device.

FIG. 1 is a block diagram of a conventional apparatus 10 to search content in a multimedia device. Referring to FIG. 1, the conventional apparatus 10 includes a user input unit 11, a query configuration unit 12, a content search unit 13, a search result output unit 14, and a content storage unit 15.

The user input unit 11 receives a search request from a user, and the query configuration unit 12 configures the received search request into a standardized query format. Here, the user input unit 11 may be understood as a remote control of the multimedia device, and the user may input a value to search for desired content by manipulating a predetermined button on the remote control.

The content search unit 13 searches content stored in the content storage unit 14 for content corresponding to the standardized query format which was configured by the query configuration unit 12.

The search result output unit 14 configures search results of the content search unit 13 according to a format designated by the standardized query and provides the search results on a predetermined user interface. For example, the search result output unit 14 may provide the search results in the form of a list, and the user may search the list for desired content. If not all search results of the list can be displayed on the user interface, the user may scroll through the list to view search results which are not displayed.

As described above, the conventional apparatus 10 searches content using, for example, the remote control with limited input functions. Therefore, it requires a large amount of time for the user to search for desired content using the conventional apparatus 10. In addition, as the amount of content stored in the content storage unit 15 increases, the time required for the content search unit 13 to search the content also increases, thereby undermining user convenience.

Korean Patent Publication No. 2005-0066790 discloses a method of searching multimedia content and supporting the browsing of search results. According to the method, after content and metadata information are searched and browsed, search results are provided in such a way that enables interactions with a user. Therefore, the user can efficiently search content and browse search results. However, this conventional art does not suggest a method of reducing the time required to search for desired content among an increasing amount of content.

SUMMARY OF THE INVENTION

Aspects of the present invention provide an apparatus and method to search content in a multimedia device, the apparatus and method capable of arranging content according to an arrangement standard that corresponds to metadata of the content, thereby enabling a user to easily search for desired content.

According to an aspect of the present invention, there is provided an apparatus to search content in a multimedia device, the apparatus including: a content storage unit to store content; a metadata storage unit to store metadata of the stored content; a user input unit to receive an input of a current arrangement standard, from one or more arrangement standards corresponding to the metadata, from a user; a content arrangement unit to arrange the stored content according to the current arrangement standard; and a user interface provision unit to provide a user interface that displays the arranged content.

According to another aspect of the present invention, there is provided a method of searching content in a multimedia device, the method including: storing content; storing metadata of the stored content; receiving an input of a current arrangement standard, from one or more arrangement standards corresponding to the metadata, from a user; arranging the stored content according to the current arrangement standard; and providing a user interface that displays the arranged content.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, an apparatus and method to search content in a multimedia device according to aspects of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create devices and/or methods to implement the functions specified in the flowchart block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction methods that implement the function specified in the flowchart block or blocks.

The computer program instructions may also be loaded onto a computer or other programmable data processing apparatus to cause a series of operations to be performed on the computer or other programmable apparatus to produce a computer-implemented process such that the instructions that execute on the computer or other programmable apparatus provide operations to implement the functions specified in the flowchart block or blocks.

And each block of the flowchart illustrations may represent a module, segment, or portion of code, which comprises one or more executable instructions to implement the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
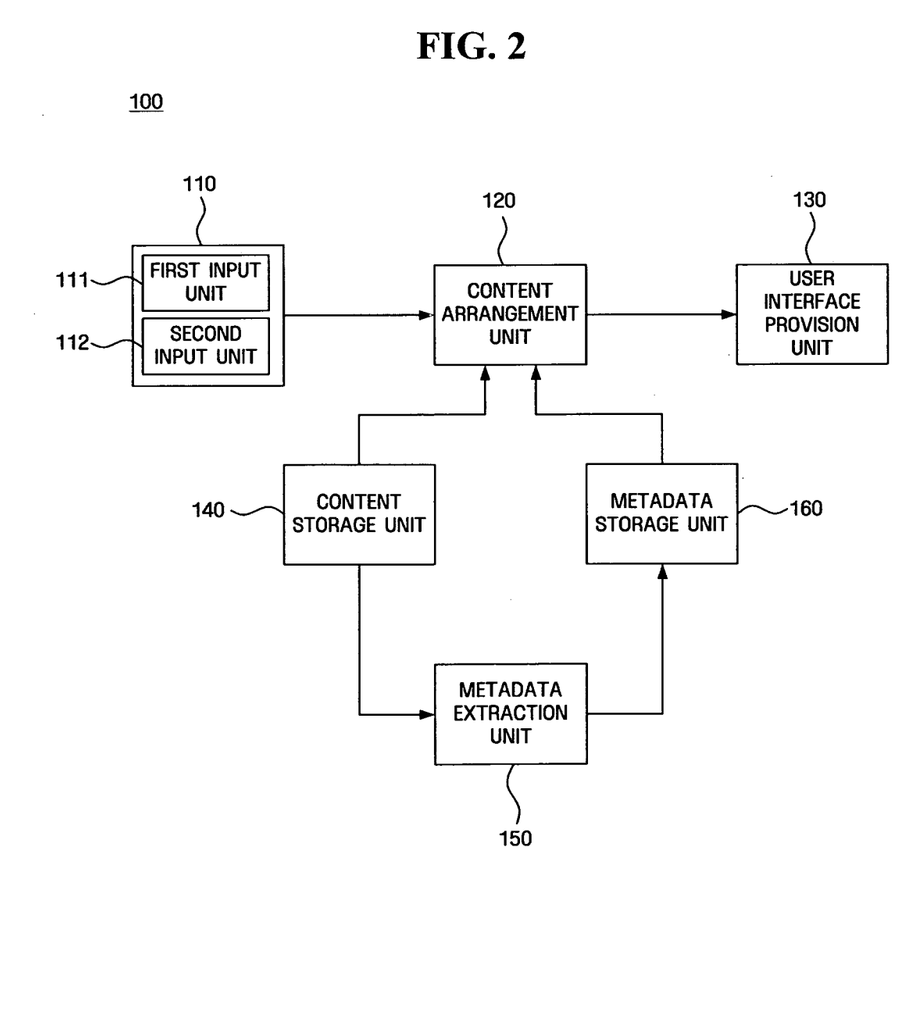
FIG. 2 is a block diagram of an apparatus to search content in a multimedia device according to an embodiment of the present invention.

FIG. 2 is a block diagram of an apparatus 100 to search content in a multimedia device according to an embodiment of the present invention. Referring to FIG. 2, the apparatus 100 may include a user input unit 110, a content arrangement unit 120, a user interface provision unit 130, a content storage unit 140, a metadata extraction unit 150, and a metadata storage unit 160. In the present embodiment, a multimedia device may be any device (such as a digital television (TV) or a mobile phone) that can store various content (such as images, moving images, and music) and provide the stored content to a user. However, aspects of the present invention are not limited thereto.

The user input unit 110 may receive a value corresponding to a predetermined arrangement standard from a user. In the case of a digital TV, the user input unit 110 may, although not necessarily, be a remote control or various input buttons installed on the digital TV. Therefore, the user can input a desired arrangement standard using the user input unit 110. In addition, the user can check the arrangement standard, which corresponds to the value input by the user using the user input unit 110, through a user interface provided by the user interface provision unit 130. The user interface displayed on the multimedia device will be described in detail later in relation to the user interface provision unit 130.

In the present embodiment, an arrangement standard, from among a plurality of arrangement standards, may be determined according to types of content. For example, if content is images, the arrangement standard may be image color, image composition, or image creation date. If the content is music, the arrangement standard may be title, artist, or genre. If the content is moving images, the arrangement standard may be title, leading actor (actress), or genre. However, aspects of the present invention are not limited thereto.

The user input unit 110 may include a first input unit 111 to search arranged content and a second input unit 112 to change an arrangement standard. Therefore, the user may search arranged content using the first input unit 111 and change the arrangement standard using the second input unit 112 in order to rearrange the arranged content according to the changed arrangement standard and search the rearranged content. However, it is understood that, according to other aspects of the present invention, the user input unit 110 may include more than two input units.

The content arrangement unit 120 may arrange content stored in the multimedia device according to the arrangement standard corresponding to the input value. In addition, the content arrangement unit 120 may rearrange the content stored in the multimedia device whenever the arrangement standard is changed. For example, when the stored content is images and arranged according to image color, if the arrangement standard corresponding to the value input through the user input unit 110 is image composition, the content arrangement unit 120 may rearrange the content according to the image composition.

Here, the content arrangement unit 120 may extract identification information (e.g., ID) of an image and use the identification information as a basis for rearranging the content according to image composition. Then, the content arrangement unit 120 may rearrange the content based on the image corresponding to the extracted identification information. That is, while an image is displayed, if the user changes the arrangement standard from image color to image composition, the content arrangement unit 120 may rearrange the content according to image composition and then arrange the displayed image to be displayed again so that images having similar composition to that of the displayed image can be searched.

The user interface provision unit 130 displays the content, which is arranged by the content arrangement unit 120 as described above, on the user interface so that the user can view the arranged content.

Figure 3:
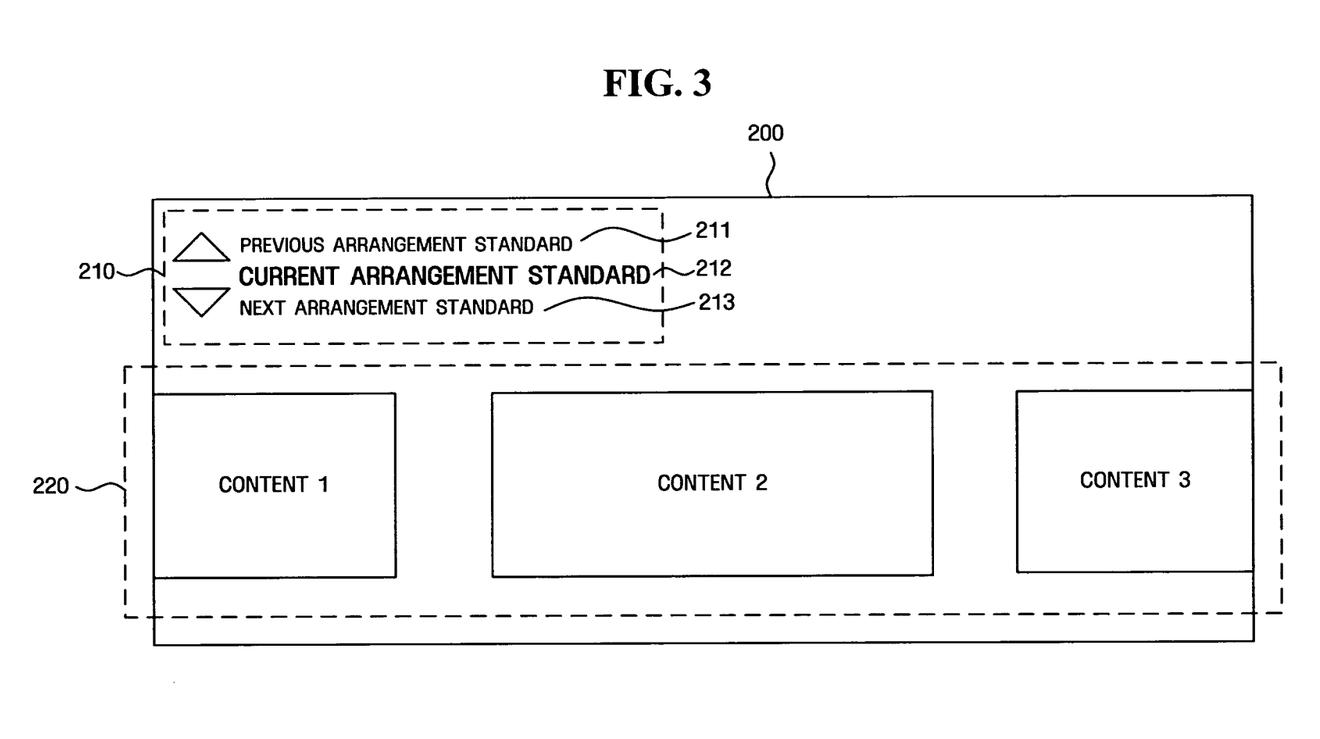
FIG. 3 illustrates a user interface according to an embodiment of the present invention.

FIG. 3 illustrates a user interface 200 according to an embodiment of the present invention. Referring to FIG. 3, the user interface 200 may include an arrangement standard display portion 210 to display an arrangement standard corresponding to a value input through the user input unit 110 and a content display portion 220 to display content arranged according to a current arrangement standard 212.

The arrangement standard display portion 210 displays the current arrangement standard 212, a previous arrangement standard 211, and a next arrangement standard 213. Therefore, a user can identify the arrangement standards that can be inputted through the user input unit 110 as described above.

The content display portion 220 may display content arranged according to the current arrangement standard 212. Here, content displayed at the center of the content display portion 220 may remain displayed (or be displayed again) at the center of the content display portion 220 even after the current arrangement standard 212 is changed and the content arrangement unit 120 rearranges the content according to a new arrangement standard. That is, the user can search the content rearranged according to the new arrangement standard based on the content which is displayed at the center of the content display portion 220. However, it is understood that according to other aspects, other content may be displayed at the center or used as the base content when a new arrangement standard is selected (such as a first stored content or a first alphabetized content).

Figure 4:
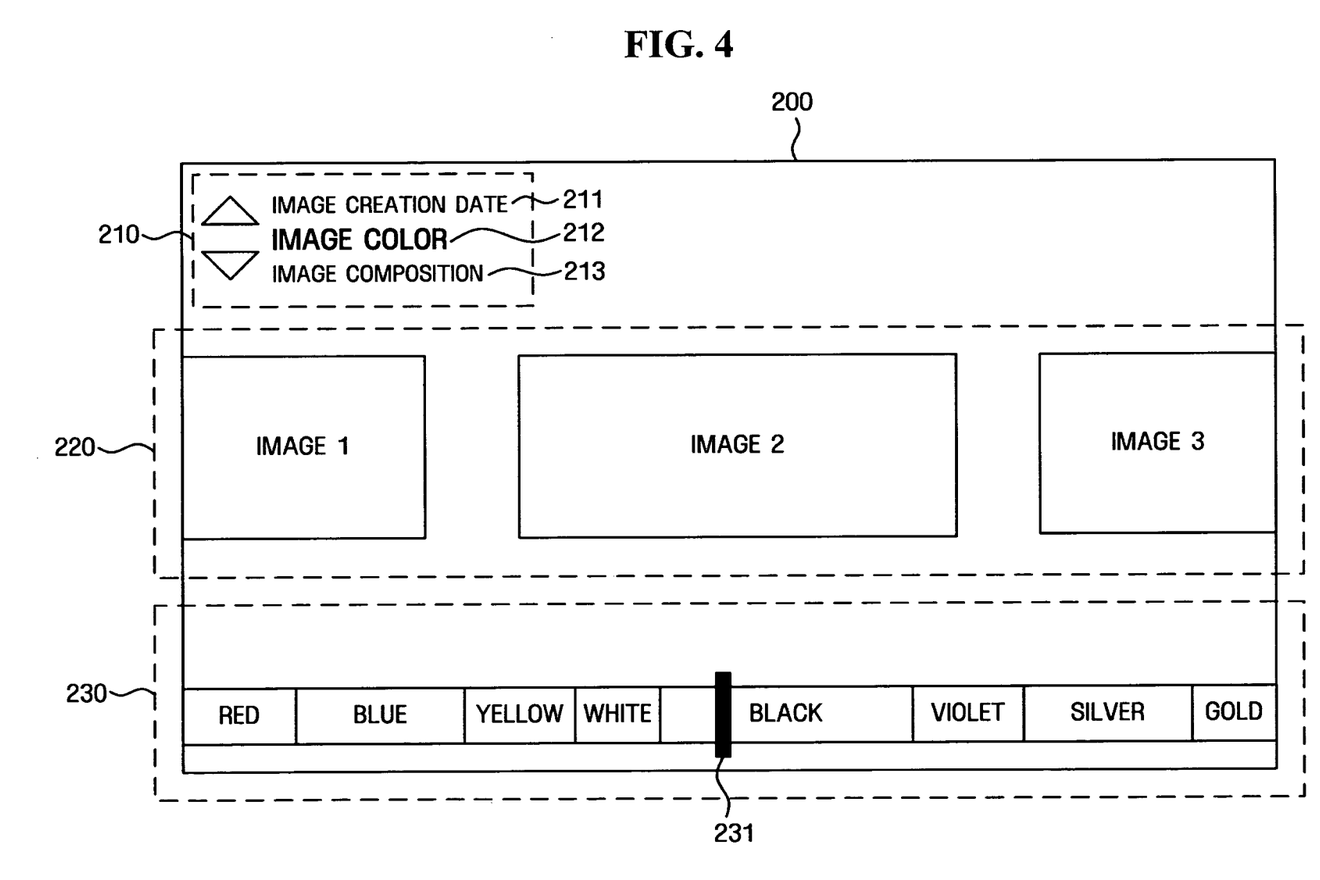
FIG. 4 illustrates a user interface according to another embodiment of the present invention.

Referring to FIG. 4, a user interface 200 according to another embodiment of the present invention may include an arrangement unit display portion 230 to display arrangement units according to an arrangement standard. That is, if image color is input as a current arrangement standard 212, content arranged according to the image color may be displayed on a content display portion 220. Here, the arrangement units refer to each color. If a user desires to search for images in a different color, the user may move a bar 231 to each of the arrangement units classified by color, and search for images in the desired color. Here, the images may include a plurality of colors, and the search is performed according to main colors among the plurality of colors included in the images when the desired color is searched for. Even when the user scrolls through the content, since the bar 231 of the arrangement unit display portion 230 moves accordingly, the user can easily identify a color according to which images currently displayed are arranged. It is understood that, according to other aspects, the user interface 200 may include more portions to display other types of information (such as file information). Furthermore, it is understood that the user input unit 110 may be a touch screen on the user interface 200.

The content storage unit 140 is as a storage medium that can store content input to the multimedia device. The content storage unit 140 may be included in the multimedia device. Alternatively, according to other aspects of the present invention, the content storage unit 140 may be separately implemented as an external storage medium and connected to the multimedia device by a wired connection (such as a predetermined interface cable) or a wireless connection (such as Bluetooth or infrared). However, the present invention is not limited thereto. Since the content arrangement unit 120 arranges content based on identification information of the content stored in the content storage unit 140, the content arrangement unit 120 can minimize memory use.

When content is stored in the content storage unit 140, the metadata extraction unit 150 may extract metadata from the content being stored. As described above, if the content is an image, the metadata may include, for example, the color, composition, and creation date of the image. If the content is music, the metadata may include, for example, title, artist, and genre. If the content is a moving image, the metadata may include, for example, title, leading actor (actress), and genre. However, the present invention is not limited thereto. The extracted metadata may also be understood as an arrangement standard for arranging the content.

The metadata extraction unit 150 extracts the metadata from the content in order to allow the content arrangement unit 120 to refer to the extracted metadata when rearranging the content according to an arrangement standard which corresponds to a value input to the user input unit 110.

The metadata storage unit 160 may store the metadata extracted by the metadata extraction unit 150, and the content arrangement unit 120 may arrange content according to an arrangement standard with reference to the metadata stored in the metadata storage unit 160.

Figure 5:
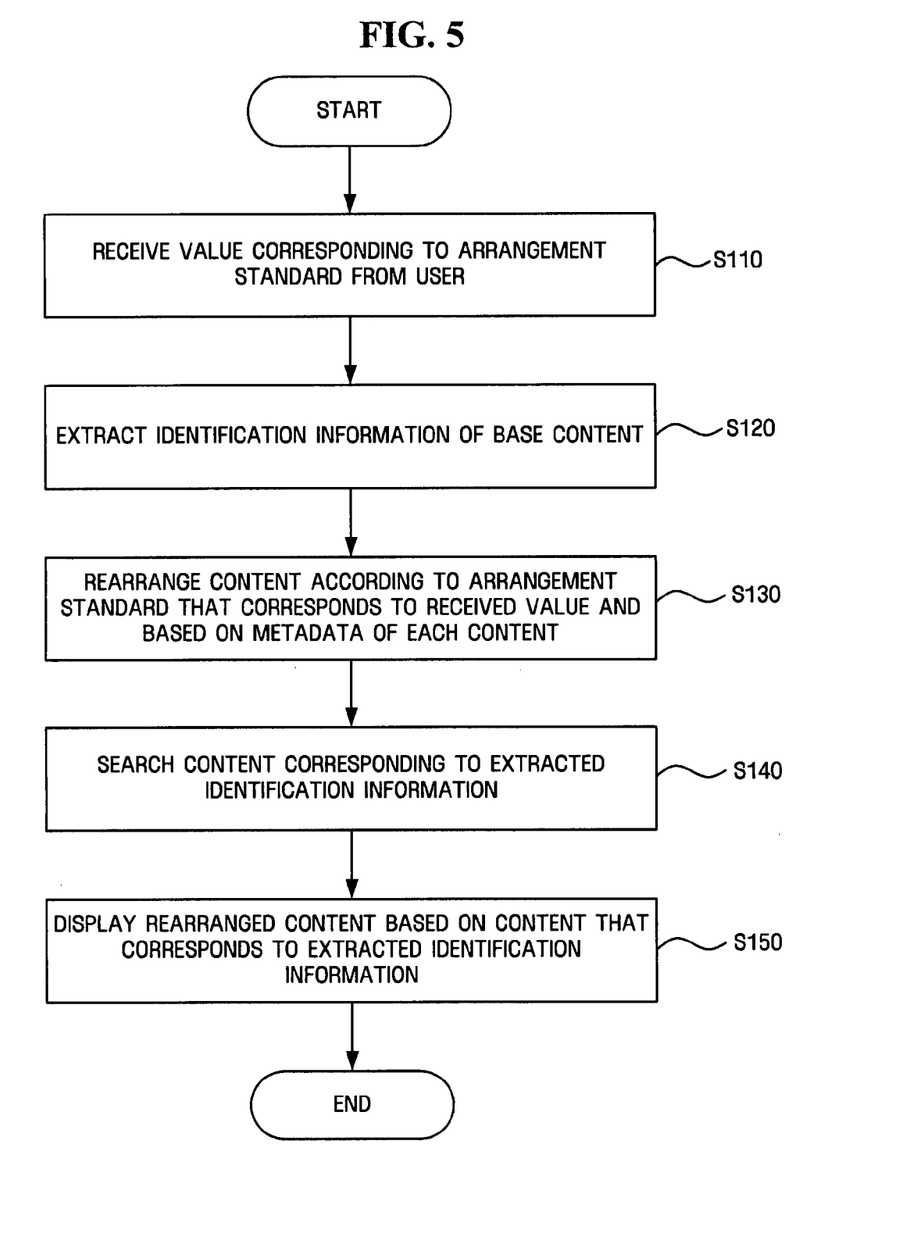
FIG. 5 is a flowchart illustrating a method of searching content in a multimedia device according to an embodiment of the present invention.

FIG. 5 is a flowchart illustrating a method of searching content in a multimedia device according to an embodiment of the present invention. A case where a user changes an arrangement standard while content is arranged according to the arrangement standard and displayed accordingly on a user interface will be described as an example in FIG. 5.

Referring to FIG. 5, a user inputs a value corresponding to a desired arrangement standard using the user input unit 110 (operation S110). Here, the user may check the previous arrangement standard 211, the current arrangement standard 222 and the next arrangement standard 223, which are displayed on the arrangement standard display portion 210 of the user interface 200 described above, and input a value corresponding to a desired arrangement standard using, for example, a remote control, buttons installed on the multimedia device, a touch screen, etc. For example, when images are displayed on the content display portion 220 of the user interface 200 and the current arrangement standard 212 is image creation date, the user may change the current arrangement standard 212 to another arrangement standard using a control key of the remote control.

When the user inputs the value through the user input unit 110, the content arrangement unit 120 may set content displayed at the center of the content display portion 220 of the user interface 200 as base content among a plurality of content displayed on the content display portion 220 and may therefore extract identification information of the base content (operation S120). The content arrangement unit 120 may set the content displayed at the center of the content display portion 220 as the base content in order to display the plurality of content, after being rearranged, on the content display portion 220 based on the content displayed at the center of the content display portion 220.

The content arrangement unit 120 rearranges the plurality of content based on metadata of each content, which is stored in the metadata storage unit 160, according to the arrangement standard corresponding to the value input through the user input unit 110 (operation S130).

After completing the rearrangement of the content, the content arrangement unit 120 searches for the identification information of the base content extracted in operation S120 (operation S140).

If the content arrangement unit 120 finds the identification information of the base content extracted in operation S120, the user interface provision unit 130 positions the base content corresponding to the found identification information at the center of the content display portion 220 and displays the rearranged content on the content display portion 220 based on the base content (operation S150). Here, the arrangement standard display portion 210 of the user interface 200 also displays the arrangement standard corresponding to the input value as the current arrangement standard 212.

Figure 6:
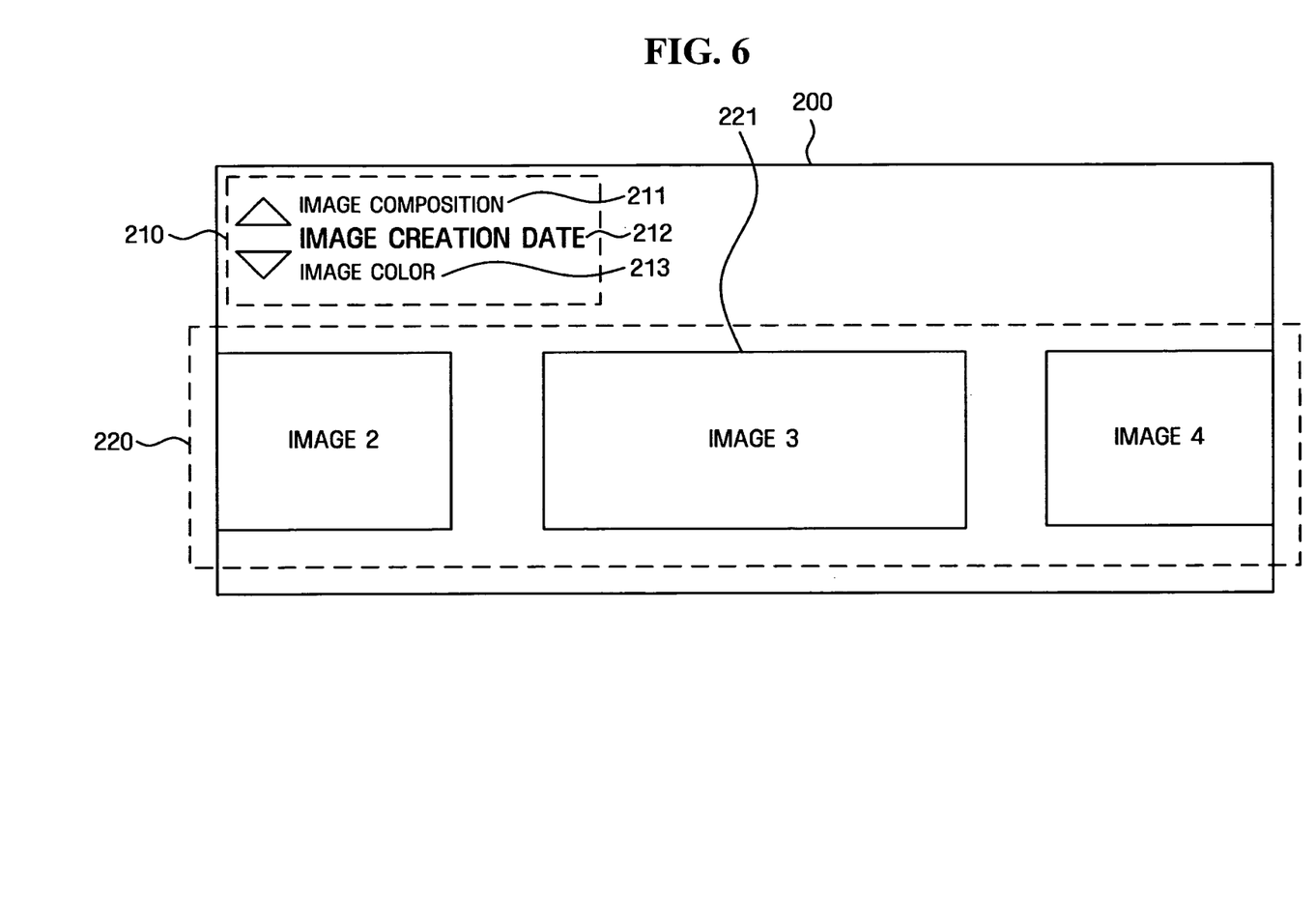
FIGS. 6 through 8 illustrate a user interface displaying content arranged based on an arrangement standard according to an embodiment of the present invention.
Figure 7:
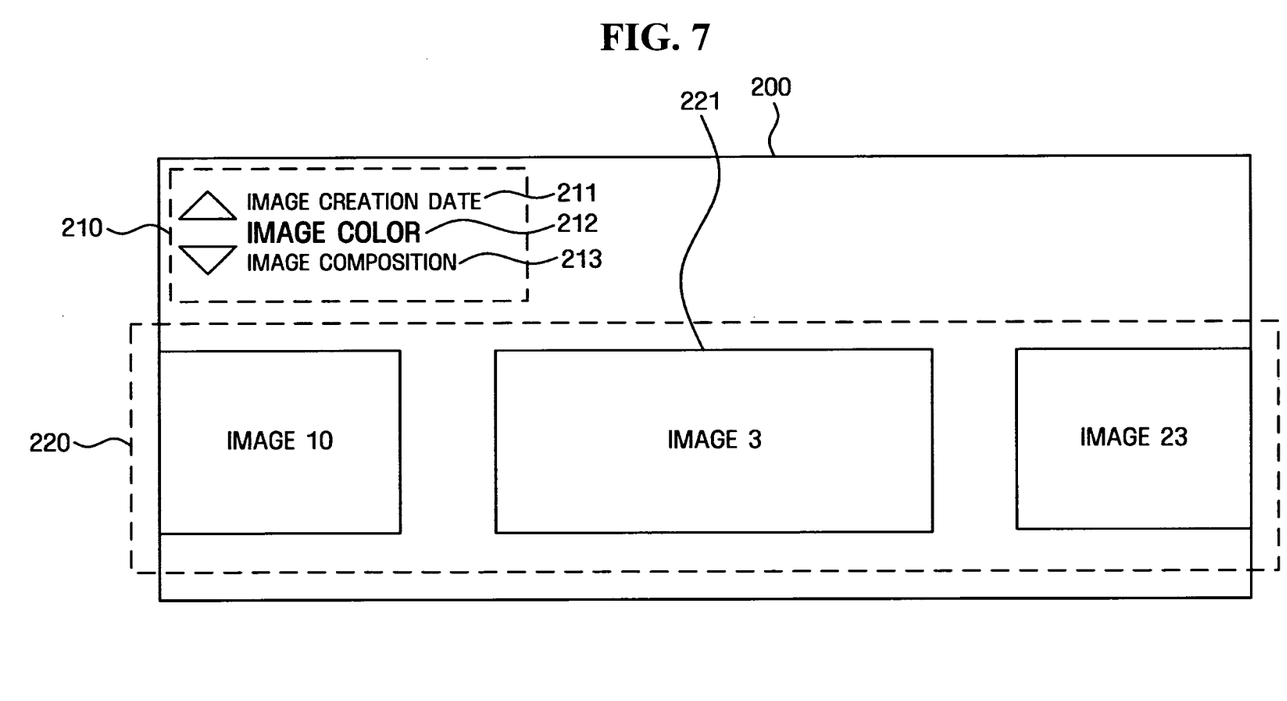
Figure 8:
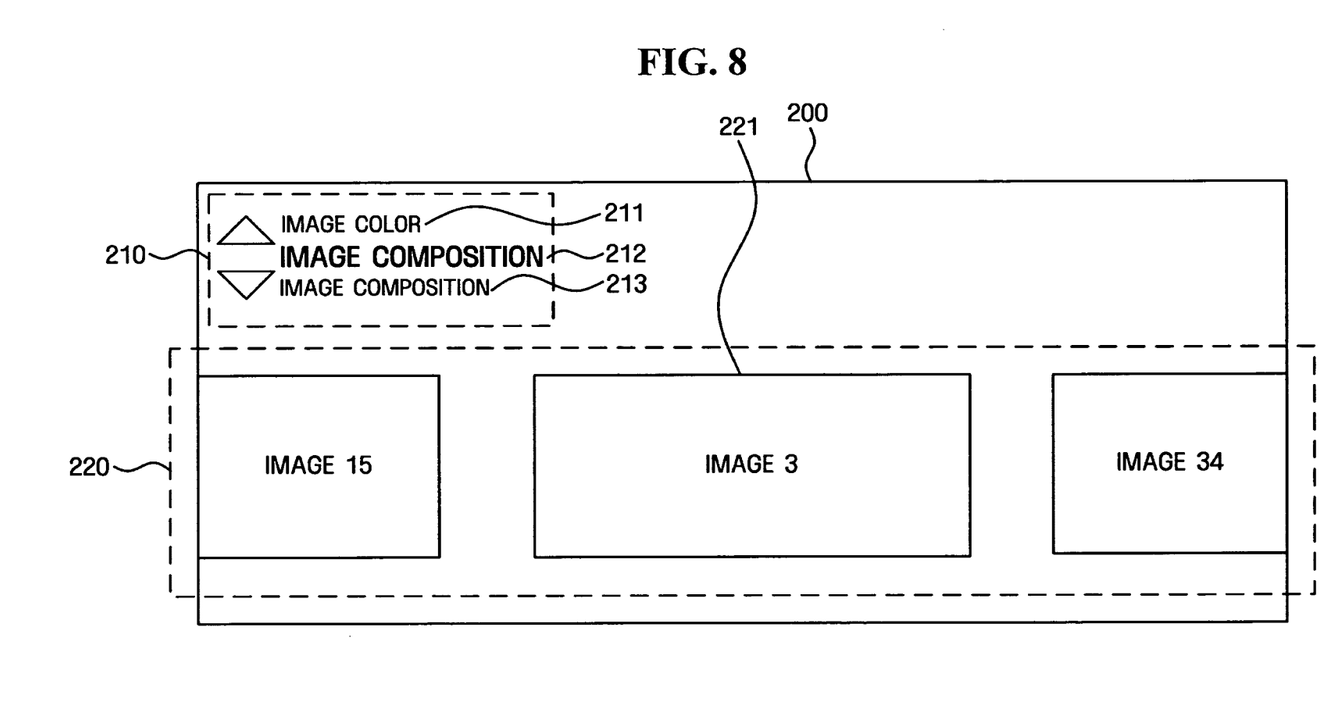

FIGS. 6 through 8 illustrate a user interface displaying content arranged based on an arrangement standard according to an embodiment of the present invention. A case where the content displayed on the user interface illustrated in FIGS. 6 through 8 is images will be described as an example.

If an arrangement standard is image creation date, images may be displayed on the user interface 200 of the content display portion 220 as illustrated in FIG. 6. Referring to FIG.

6, the arrangement standard display portion 210 displays image creation date as a current arrangement standard 212, image composition as a previous arrangement standard 211, and image color as a next arrangement standard 213. If a user changes the current arrangement standard 212 in FIG. 6, a third image 221 displayed at the center of the content display portion 220 may become a base image. In FIG. 6, image creation date, which is the current arrangement standard 212, may have arrangement units such as days, months, or years.

If the user changes the current arrangement standard 212 to image color, which is the next arrangement standard 213, the current arrangement standard 212 displayed on the arrangement standard display portion 210 may be changed to image color as illustrated in FIG. 7. The content arrangement unit 120 extracts identification information of the third image 221, which is the base image, in FIG. 6, and positions the third image 221 corresponding to the extracted identification information at the center of the content display portion 220 in FIG. 7.

If the user changes the current arrangement standard 212 to image composition, as illustrated in FIG. 8, the current arrangement standard 212 displayed on the arrangement standard display portion 210 may be changed to image composition, and the previous arrangement standard 211 may be changed to image color, and the next arrangement standard 213 may be changed to image creation date. The content arrangement unit 120 extracts identification information of the third image 221, which is the base image, in FIG. 7 and positions the third image 221 corresponding to the extracted identification information at the center of the content display portion 220 again in FIG. 8.

As illustrated in FIGS. 6 through 8, if content is images and an arrangement standard is image creation date, image color, or image composition, whenever the arrangement standard is changed, the content is rearranged according to the changed arrangement standard and displayed accordingly. However, it is understood that this is merely an example used to help promote the understanding of the present invention, and aspects of the present invention are not limited thereto. That is, if the content is music, the arrangement standard may be title, artist, or genre, and if the content is moving images, the arrangement standard may be title, leading actor (actress), or genre. Therefore, the content may be arranged according to the arrangement standard and displayed accordingly as illustrated in FIGS. 6 through 8.

The term unit, as used herein (with the exception of the arrangement unit), refers to, but is not limited to, a software or hardware component, such as a Field Programmable Gate Array (FPGA) or Application Specific Integrated Circuit (ASIC), which performs certain tasks. A unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

As described above, an apparatus and method to search content in a multimedia device according to aspects of the present invention provide at least one of the following advantages. First, since content can be arranged according to an arrangement standard that corresponds to metadata of the content, desired content can be easily searched for. Second, a user interface displaying an arrangement standard and content arranged according to the arrangement standard can be provided. Therefore, desired content can be easily searched for even using an input device with limited functions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to search content in a multimedia device, the apparatus comprising:
a content storage unit configured to store the content;
a metadata storage unit configured to store metadata of the stored content;
a content arrangement unit configured to arrange the stored content according to an arrangement standard from among a plurality of arrangement standards, each arrangement standard, from among the plurality of arrangement standards, corresponding to a respective category of metadata of the stored content, and the plurality of arrangement standards comprising different arrangement standards based on whether the stored content is an image, music, or a moving image;
a user input unit configured to receive an input of a current arrangement standard from among the plurality of arrangement standards; and
a user interface provision unit configured to provide a user interface configured to display the arranged content,
wherein the content arrangement unit is further configured to arrange the stored content according to the current arrangement standard and the metadata, to extract identification information of base content when arranging the stored content, and, in response to the current arrangement standard being changed, to rearrange the stored content around the base content.

2. The apparatus as claimed in claim 1, further comprising a metadata extraction unit to extract the metadata from the stored content to be stored in the metadata storage unit.

3. The apparatus as claimed in claim 1, wherein the user input unit comprises:
a first input unit configured to search content arranged according to the current arrangement standard; and
a second input unit configured to receive the input of the current arrangement standard.

4. The apparatus as claimed in claim 1, wherein the user interface comprises:
an arrangement standard display portion configured to display the current arrangement standard; and
a content display portion configured to display the arranged content.

5. The apparatus as claimed in claim 4, wherein the arrangement standard display portion is further configured to simultaneously display a plurality of arrangement standards, including the current arrangement standard.

6. The apparatus as claimed in claim 1, wherein the user interface comprises:
an arrangement standard display portion configured to display the current arrangement standard; and
a content display portion configured to display the arranged content.

7. The apparatus as claimed in claim 6, wherein the content arrangement unit sets a center content displayed on the content display portion as the base content.

8. The apparatus as claimed in claim 7, wherein the content arrangement unit is further configured to arrange the content such that the base content remains displayed on the content display portion after the current arrangement standard is changed.

9. The apparatus as claimed in claim 6, wherein the arrangement standard display portion is further configured to simultaneously display a previous arrangement standard, the current arrangement standard, and a next arrangement standard.

10. The apparatus as claimed in claim 6, wherein the user interface further comprises an arrangement unit display portion configured to display arrangement units of the current arrangement standard.

11. The apparatus as claimed in claim 6, wherein the arrangement unit display portion is further configured to distinguish a current arrangement unit corresponding to a metatag of a center content displayed on the content display unit.

12. The apparatus as claimed in claim 1, wherein the content comprises at least one of image content, music content, and moving images content.

13. A method of searching content in a multimedia device, the method comprising:
   storing the content;
   storing metadata of the stored content;
   arranging the stored content according to an arrangement standard from among a plurality of arrangement standards, each arrangement standard, from among the plurality of arrangement standards, corresponding to a respective category of metadata of the stored content, and the plurality of arrangement standards comprising different arrangement standards based on whether the stored content is an image, music, or a moving image;
   receiving an input of a current arrangement standard from among the plurality of arrangement standards; and
   providing a user interface that displays the arranged content,
   wherein the arranging further comprises arranging the stored content according to the current arrangement standard and the metadata, extracting identification information of base content when arranging the stored content, and, in response to the current arrangement standard being changed, rearranging the stored content around the base content.

14. The method as claimed in claim 13, wherein the storing of the metadata comprises extracting the metadata from the stored content.

15. The method as claimed in claim 13, wherein the receiving of the input comprises:
   receiving an input to search content arranged according to the current arrangement standard; and
   receiving the input to change the current arrangement standard.

16. The method as claimed in claim 13, wherein the user interface comprises:
   an arrangement standard display portion to display the current arrangement standard; and
   a content display portion to display the arranged content.

17. The method as claimed in claim 16, wherein the arrangement standard display portion simultaneously displays a plurality of arrangement standards, including the current arrangement standard.

18. The method as claimed in claim 13, wherein the user interface comprises:
   an arrangement standard display portion to display the current arrangement standard; and
   a content display portion to display the arranged content.

19. The method as claimed in claim 18, wherein the arranging of the stored content further comprises setting a center content displayed on the content display portion as the base content.

20. The method as claimed in claim 19, wherein the arranging of the stored content further comprises arranging the content such that the base content remains displayed on the content display portion after the current arrangement standard is changed.

21. The method as claimed in claim 18, wherein the arrangement standard display portion simultaneously displays a previous arrangement standard, the current arrangement standard, and a next arrangement standard.

22. The method as claimed in claim 18, wherein the user interface further comprises an arrangement unit display portion to display arrangement units of the current arrangement standard.

23. An apparatus to search content in a multimedia device, the apparatus comprising:
   a metadata storage unit configured to store metadata of the content;
   a content arrangement unit configured to arrange the stored content according to an arrangement standard from among a plurality of arrangement standards, each arrangement standard, from among the plurality of arrangement standards, corresponding to a respective category of metadata of the stored content, and the plurality of arrangement standards comprising different arrangement standards based on whether the stored content is an image, music, or a moving image; and
   a user input unit configured to receive an input of a current arrangement standard from the plurality of arrangement standards,
   wherein the content arrangement unit is further configured to arrange the stored content according to the current arrangement standard and the metadata, to extract identification information of base content when arranging the stored content, and, in response to the current arrangement standard being changed, to rearrange the stored content around the base content.

24. The apparatus as claimed in claim 23, further comprising a content storage unit configured to store the content.

25. The apparatus as claimed in claim 23, further comprising a metadata extraction unit configured to extract the metadata from the content to be stored in the metadata storage unit.

26. The apparatus as claimed in claim 23, wherein the user input unit comprises:
   a first input unit configured to search content arranged according to the current arrangement standard; and
   a second input unit configured to receive the input of the current arrangement standard.

27. The apparatus as claimed in claim 23, further comprising a user interface provision unit configured to provide a user interface that displays the arranged content.

28. The apparatus as claimed in claim 27, wherein the user interface comprises:
   an arrangement standard display portion configured to display the current arrangement standard; and
   a content display portion configured to display the arranged content.

29. The apparatus as claimed in claim 28, wherein the content arrangement unit is further configured to set a center content displayed on the content display portion as the base content.

30. The apparatus as claimed in claim 29, wherein the content arrangement unit is further configured to arrange the content such that the base content remains displayed on the content display portion after the current arrangement standard is changed.

31. The apparatus as claimed in claim 28, wherein the arrangement standard display portion is further configured to simultaneously display a previous arrangement standard, the current arrangement standard, and a next arrangement standard.

32. The apparatus as claimed in claim 28, wherein the user interface further comprises an arrangement unit display portion configured to display arrangement units of the current arrangement standard.

33. The apparatus as claimed in claim 28, wherein the arrangement unit display portion is further configured to distinguish a current arrangement unit corresponding to a metatag of a center content displayed on the content display unit.

* * * * *